US012808409B2

(12) United States Patent
Greco et al.

(10) Patent No.: US 12,808,409 B2
(45) Date of Patent: Nov. 24, 2026

(54) SUPER-PRECISION ROLLING BEARING FOR HIGH-SPEED APPLICATIONS AND HIGH CONTACT PRESSURES, AND ASSOCIATED METHOD

(71) Applicant: AKTIEBOLAGET SKF, Gothenburg (SE)

(72) Inventors: Feliciano Greco, Cortemilia (IT); Mohamed Youssef Abdelraouf Sherif, Västmanland (SE); Leonardo Catana, Chieri (IT)

(73) Assignee: AKTIEBOLAGET SKF, Gothenburg (SE)

( * ) Notice: Subject to any disclaimer, the term of this patent is extended or adjusted under 35 U.S.C. 154(b) by 573 days.

(21) Appl. No.: 18/318,166

(22) Filed: May 16, 2023

(65) Prior Publication Data

US 2023/0375044 A1 Nov. 23, 2023

(30) Foreign Application Priority Data

May 23, 2022 (IT) ........................ 102022000010586

(51) Int. Cl.
*F16C 33/62* (2006.01)
*F16C 33/64* (2006.01)

(52) U.S. Cl.
CPC .............. *F16C 33/62* (2013.01); *F16C 33/64* (2013.01); *F16C 2202/04* (2013.01); *F16C 2204/70* (2013.01)

(58) Field of Classification Search
CPC ...... F16C 33/58; F16C 33/583; F16C 33/585; F16C 33/586; F16C 33/62; F16C 33/64;
(Continued)

(56) References Cited

U.S. PATENT DOCUMENTS

| | | | | |
|---|---|---|---|---|
| 6,290,398 B1 * | 9/2001 | Fujiwara | F16C 33/64 | 384/492 |
| 2004/0071379 A1 * | 4/2004 | Carrerot | F16C 33/34 | 384/565 |

(Continued)

FOREIGN PATENT DOCUMENTS

| | | |
|---|---|---|
| EP | 2935918 B1 | 5/2019 |
| JP | 2000314427 A | 11/2000 |

(Continued)

OTHER PUBLICATIONS

Machine Translation of JP-2004169848-A (Year: 2004).*
(Continued)

*Primary Examiner* — Alan B Waits
(74) *Attorney, Agent, or Firm* — J-TEK LAW PLLC; Scott T. Wakeman; Mark A. Ussai

(57) ABSTRACT

A super-precision rolling bearing includes a first ring having a first raceway, a second ring having a second raceway, and a plurality of rolling elements arranged between the first and second raceways. The first and/or second ring is made of a hardened and tempered nitriding steel core having a first predetermined hardness and a nitrided surface layer coating at least the first raceway and containing nitrides in an amount to give the nitrided steel layer a second predetermined hardness greater than the first predetermined hardness.

7 Claims, 2 Drawing Sheets

(58) Field of Classification Search
CPC .............. F16C 2202/04; F16C 2204/70; F16C 2223/14
See application file for complete search history.

(56) References Cited

U.S. PATENT DOCUMENTS

| | | | | |
|---|---|---|---|---|
| 2016/0130692 | A1* | 5/2016 | Birky | C22C 38/56 148/334 |
| 2019/0186598 | A1* | 6/2019 | Fisher | F16C 19/361 |
| 2020/0010940 | A1* | 1/2020 | Kerrigan | C21D 9/40 |
| 2020/0400192 | A1* | 12/2020 | Colynuck | F16C 19/225 |

FOREIGN PATENT DOCUMENTS

| | | | |
|---|---|---|---|
| JP | 2004169848 | A * | 6/2004 |
| WO | 2011138309 | A1 | 11/2011 |
| WO | 2018036590 | A1 | 3/2018 |

OTHER PUBLICATIONS

"Materials for Rolling Bearing Technology", pp. 1-31, Schaeffler Technologies AG & Co. KG, Schweinfurt, Germany.

"X-life spindles made from Vacrodur", pp. 1-8, Schaeffler Technologies AG & Co. KG, Schweinfurt, Germany.

ASM International, "An Introduction to Nitriding—Practical Nitriding and Ferritic Nitrocarburizing (#06950G)", 2003, pp. 1-12, ASM International, Ohio, USA.

Berns, "Ferrous materials—Steel and Cast Iron", 2008, pp. 1-421, Springer. Berlin, Germany, ISBN 978-3-540-71847-5.

Daniel Girodin: "Deep Nitrided 32CrMoV13 Steel for Aerospace Bearings Applications",NTN Technical Review No. 76 (2008), Oct. 31, 2008 (Oct. 31, 2008), pp. 24-31, XP009541354, Osaka [JP]ISSN: 0915-0528.

Marco V. Boniardi, "Gli acciai da nitrurazione e il loro trattamento termico", Feb. 16, 2013, pp. 1-10, Dipartimento di Meccanica, Politecnico di Milano.

Mei Yang, "Nitriding- fundamentals modeling and process optimization", Apr. 2012, pp. 1-139, Submitted to the Faculty of the Worcester Polytechnic Institute, Massachussetts, USA.

Philippe Maugis, "Kinetics of vanadium carbonitride precipitation in steel: A computer model", Mar. 28, 2005, pp. 3359-3367, Acta Materialia Inc. Published by Elsevier Ltd., Amsterdam, Netherlands.

Written Opinion and Search Report from the Italian Patent Office mailed Dec. 21, 2022 in related application No. 1022000010586, and translation thereof.

* cited by examiner

SUPER-PRECISION ROLLING BEARING FOR HIGH-SPEED APPLICATIONS AND HIGH CONTACT PRESSURES, AND ASSOCIATED METHOD

CROSS-REFERENCE

This application claims priority to Italian patent application no. 10 2022 000010586 filed on May 23, 2023, the contents of which are fully incorporated herein by reference.

TECHNOLOGICAL FIELD

The present disclosure is directed to a super-precision rolling bearing for use in applications where the rolling bearing must withstand both high rotational speeds (for example equivalent to an NDm value of 2-3 million) and high contact pressures (for example 2-3 Giga Pascal) between the rolling elements and raceways formed on the inner and outer rings of the rolling bearing and to an associated method.

BACKGROUND

A method for making rolling bearing rings by powder metallurgy is known for example from WO 2018/036590 A1. That method makes use of additive manufacturing and/or forming methods that are based on diffusion bonding by means of hot isostatic pressure, followed by heat treatments such as case-hardening and subsequent tempering. It is also known to perform in some cases a nitriding treatment, but only following the case-hardening treatment, in which the surface of the mechanical element undergoing treatment is enriched with carbon.

Using this method it is possible to obtain a relatively high hardness of the mechanical elements treated, for example the rings of a rolling bearing, but it is relatively complex and costly to implement. Furthermore, it is not possible to obtain simultaneously values that are completely ideal in terms of surface-hardness and resilience. Finally, the formation of carbo-nitrides is not always desirable.

SUMMARY

An aspect of the present disclosure is to provide a rolling bearing which overcomes the drawbacks of the prior art and which is simple and low-cost to produce.

It is a further aspect of the disclosure to provide a rolling bearing having inner and outer rings with high surface-hardness values together with a suitable overall resilience and/or toughness so as to be able to withstand during use high contact pressures (for example 2-3 Giga Pascal) between the rolling elements and associated raceways on the bearing rings and to have at the same time a suitable operating capacity also in the case of high rotational speeds equivalent to an NDm value of 2-3 million.

A further aspect of the disclosure is to provide a production method for super-precision rolling bearings which are configured to be used in applications in which the bearing must withstand simultaneously high rotational speeds and high contact pressures, as defined above.

The disclosure offers an approach different from that of the known methods, since the rings are hardened by means of nitriding of steels with a low carbon content instead of being core-hardened.

The treatment is carried out generally on steels which a carbon content within a range varying from 0.14% to 0.21% and which contain binding elements which favour the formation of nitrides.

BRIEF DESCRIPTION OF THE DRAWINGS

The invention will now be described with reference to the attached drawings which illustrate a non-limiting example of embodiment thereof, in which.

DETAILED DESCRIPTION

Figure 1:
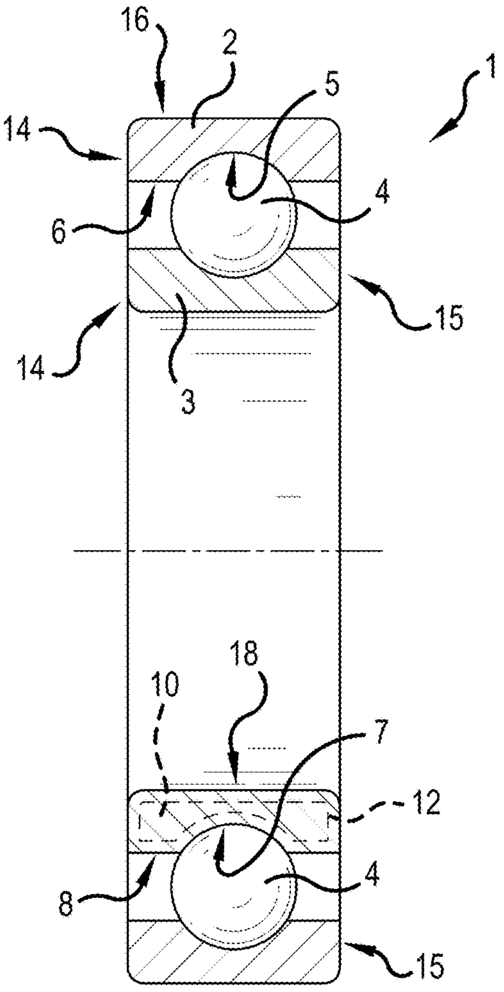
FIG. 1 is a schematic sectional elevational view of a rolling bearing according to an embodiment of the disclosure.
Figure 2:
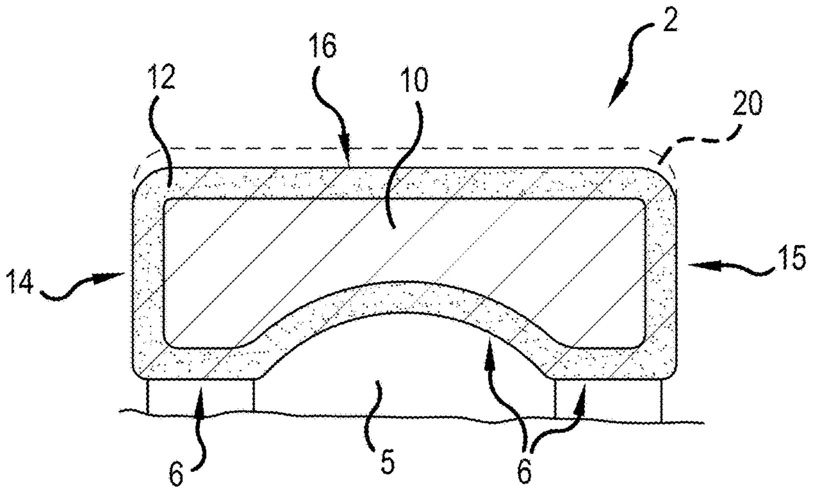
FIG. 2 is a schematic, large-scale, sectional elevational view of a detail of a radially outer ring of the rolling bearing of FIG. 1.

With reference to FIGS. 1 and 2, 1 a rolling bearing 1 includes a radially outer ring 2, a radially inner ring 3 and a plurality of rolling elements 4, in the non-limiting example shown, balls, which are arranged in a row between the inner ring 3 and the outer ring 2 so as to make the inner and outer rings rotatable relative to each other with a small amount of friction.

The rolling elements 4 engage with and roll between at least one first annular raceway 5 formed in a radially inner side surface 6 of the outer ring 2 and at least one second annular raceway 7 formed in a radially outer side surface 8 of the inner ring 3.

More generally, a rolling bearing 1 according to the disclosure comprises at least one first bearing ring having at least one raceway formed in a radially outer side surface and/or a radially inner side surface of the at least one bearing ring. Therefore, the description which follows is applicable to any type of rolling bearing, with one or two rows of balls or cylindrical or conical rollers.

According to a first aspect of the disclosure, at least a first one of the inner ring 3 and outer ring 2, and preferably both the inner ring 3 and the outer ring 2 are made of a standardized nitriding steel.

With reference to FIG. 2, the outer ring 3 and, in the same way also the inner ring 2, although not shown in detail and on an enlarged scale for simpler illustration, comprises a core 10 made of a hardened and tempered steel having a hardness equal to or less than 40 HRC (Rockwell C hardness scale) and a surface layer 12 totally or partially coating the core 10.

The surface layer 12 includes/delimits/covers the at least one respective first raceway for the rolling elements 4 and, preferably but not necessarily, also a radially facing side surface 6 to one or both sides of the first raceway 5.

According to an important aspect of the disclosure, the entire surface layer 12 (including the raceway 4 and the side surfaces 6) is subjected to a nitriding treatment; in other words, it has been obtained, as will be seen, by subjecting in its entirety a bearing ring 2 and/or 3, which has been hardened and tempered beforehand so as to obtain a desired hardness as indicated above, to a surface nitriding heat treatment.

Therefore, in the case where it is desired to obtain a hardened surface layer 12 which only partly covers the core 10, this configuration, as will be seen, can be obtained by covering (masking) the surfaces of the ring 2 and/or 3 which are not to be nitrided with a protective layer (not shown), of for example copper, which is subsequently removed when nitriding has been completed.

The surface layer 12 therefore forms a layer made entirely of nitrided steel, according to one aspect of the disclosure, containing nitrides, preferably containing, exclusively or almost exclusively, metal nitrides, in any case in an amount such as to have a hardness of between 64 and 66 HRC.

Here and below, "material exclusively or almost exclusively containing metal nitrides," should be understood to mean a material, the chemical composition of which is composed totally, or for at least 80% by weight, of metal nitrides.

For example, in the case of the present disclosure, the layer 12 will be formed by iron nitrides and by nitrides of other binding elements contained in the steel forming the core 10, preferably chromium, molybdenum and vanadium nitrides, which can be obtained by means of diffusion of nitrogen in a steel matrix. The layer 12 may also contain aluminium, nickel and tungsten nitrides.

According to the preferred embodiment of the disclosure, both the rings 2 and 3 are made of a standardized nitriding steel and each comprise a hardened and tempered core 10 having a hardness less than or equal to 40 HRC, and a nitrided surface layer 12 coating the core and containing nitrides in an amount such as to have a hardness of between 64 and 66 HRC or higher.

In a preferred example of embodiment, the nitrided surface layer 12 coating the core 10 surrounds and completely covers the core 10, as clearly shown in FIG. 2.

The core 10 is therefore completely enclosed within, or bounded by, the nitrided surface layer 12.

Consequently, according to a preferred embodiment of the disclosure, the nitrided surface layer 12 extends not only over the raceways 5, 7, but also over a corresponding first side surface, in the example shown over the side surfaces 6, 8 of the at least one bearing ring 2, 3 in question, provided with at least one respective raceway 5, 7 for the rolling elements 4, and also over respective opposite and corresponding front faces 14, 15 of the rings 2, 3 and over a second side surface of the rings 2, 3 opposite to the side surface thereof provided with the raceways 5, 7.

In other words, the nitride layer 12 extends also, continuously with respect to the faces 14, 15 and the side surfaces 6, 8, over a radially outer side surface 16 of the outer ring 2, opposite to the side surface 6, and over a radially inner side surface 18 of the radially inner ring 3 opposite to the side surface 8.

According to one aspect of the disclosure, the nitrided surface layer 12 must in any case have a depth, measured perpendicularly with respect to the at least one first side surface 6,8, of at least 0.4 mm.

The nitrided surface layer 12, as already mentioned, is composed almost exclusively (i.e. of at least 80% by weight or more) of metal nitrides.

In this way each bearing ring 2, 3 according to the disclosure is composed of a core of high-strength hardened steel surrounded by, or at least partially coated with, a layer of hardened and nitrided steel 12 which is slightly less strong, but much harder and which in the example of embodiment shown wraps tightly around it.

Experimental tests carried out by the technical experts of the Applicant have shown that with this structural combination it is possible to obtain long durability at high rotational speeds, and therefore at high tangential speeds to which the raceways 5, 7 are subjected, with an NDm value of 2-3 million, and at the same time a capacity to withstand high contact pressures equal to 2 and also 3 Giga Pascal, even when there is limited lubrication.

In order to obtain these results, it is important to suitably select the base material, i.e. the steel on which the hardening (and subsequent tempering) heat treatments and nitriding treatments are to be carried out. In fact, the steels commonly used for rolling bearing rings, such as 100Cr6, have proved to be unsuitable for achieving the desired results, even when subjected to the same heat treatments indicated above.

The inner ring 3 and/or outer ring 2 are therefore made, according to one aspect of the disclosure, of a steel complying with the specifications of the standard AMS6481 (e.g., AMS6481E—2022) and preferably chosen from the group consisting of the following steel grades: 33CrMoV12 and 32CrMoV13.

The rings 2, 3 are also made with the steels indicated above in a conventional manner, i.e. by means of casting and/or forging and subsequent tool-machining, therefore avoiding the use of alternative processing methods, such as powder metallurgy, additive manufacturing and/or diffusion bonding, proposed in the prior art as the only methods capable of obtaining bearing rings for super-precision applications characterized by high tangential speeds and high contact pressures. This results in major savings in terms of time and energy resources as well as significant production cost-savings.

According to a preferred aspect of the disclosure, the hardened and tempered steel forming the core 10 is obtained essentially without ferrite and/or pearlite, while the nitrided surface layer 12 which coats the outer and/or inner ring 2, 3, preferably enclosing within it the core 10, has a carbon content of between 0.14% and 0.21% by weight and a nitrogen content of not more than 0.3% by weight.

These chemical composition characteristics are obtained using, as base material, steels which have a carbon content within a range which varies from 0.14% to 0.21% by weight (i.e. a relatively low value) and which contain binding elements which favour the formation of nitrides, in particular Cr, Mo and V and, by then performing a series of heat treatments which moreover are of a known type, but adopting a precise time sequence.

The disclosure therefore also relates to a method for making the super-precision rolling bearings 1, comprising the step of making at least one radially outer bearing ring 2 and/or radially inner bearing ring 3, preferably both the rings 2, 3, using a steel, by means of casting and/or forging and subsequent machining, and also comprising, in combination with each other and with the aforementioned step, the following steps:

i) making said at least one bearing ring 2, 3 from a standardized nitriding steel;

ii) subjecting the at least one bearing ring 2, 3, before and/or after machining, to a series of heat treatments, including: austenitizing, hardening, preferably performed in oil, primary tempering;

iii) subjecting the at least one bearing ring 2, 3, after step ii), to a nitriding heat treatment to obtain on the at least one bearing ring 2, 3 a surface layer of hardened, tempered and nitrided steel which completely or partially covers a core 10 of hardened and tempered, non-nitrided steel;

iv) subjecting the at least one bearing ring 2, 3, after step iii), to grinding and finishing operations to remove from the nitrided surface layer 12 an upper layer 20 (shown only schematically and partly in FIG. 2 in broken lines), further away from the core 10, composed of azides (consisting, that is, of the so-called "white layer"), so as to leave on the bearing ring 2, 3 a coating layer 12 which is composed of metal nitrides and which, preferably, completely encloses the core 10 of hardened and tempered steel.

The coating layer 12 composed of metal nitrides is formed in any case so as to delimit at least one raceway 5, 7 for the rolling elements 4 and preferably also a side surface 6,8 of the bearing ring 2, 3 provided with the at least one raceway 5, 7 for the rolling elements 4.

Since the nitriding step iii) is always carried out, according to one aspect of the disclosure, over the whole of the bearing ring 2, 3, which simplifies greatly this operation, in the case where a layer 12 is to be formed so as to coat only partially the core 10, for example only the raceways 5, 7, the method according to the disclosure comprises a further step v) in which the surfaces of the bearing ring 2, 3 which do not have to receive the layer 12 are coated with a protective layer of the known type (not shown) which is resistant to the nitriding environment, for example copper. Step v) is performed in a precise time sequence, before step iii). Following step iii), the protective layer is removed, for example during the same step iv) for removal of the upper layer 20 of azides (white layer).

According to the method of the disclosure, the at least one bearing ring 2, 3 is made of a steel complying with the specifications of the standard AMS6481 (e.g., AMS6481E—2002) and preferably chosen from the group consisting of the following steel grades: 33CrMoV12, 32CrMoV13, and the nitriding step iii) is carried out at a temperature lower than that for carrying out the primary hardening heat treatment during step ii), so as to reduce as far as possible or completely eliminate any distortion of the ring 2, 3 following the phase transformations and transitions affecting the steel which forms it during the steps of the method according to the disclosure.

The steps ii), iii) and iv) are carried out so that the material forming the core 10 and including hardened and tempered, but non-nitrided steel has at the end of step iii) a hardness equal to or less than 40 HRC, while the material forming the nitrided surface layer 12 has at the end of step iv) a hardness of between 64 and 66 HRC or more, since it consists exclusively or almost exclusively of metal nitrides.

Steps iii) and iv) are also performed so that the nitrided surface layer present, at the end of step iii), preferably over all the surfaces 6, 16, 8, 18, 14 and 15 and composed of the layer 12 and the layer 20 superimposed on it, has a thickness, measured perpendicularly with respect to a side surface 6, 8 of the at least one bearing ring 2, 3 provided with the at least one raceway 5, 7, of between 0.5 and 0.7 mm, preferably equal to about 0.6 mm, and, at the end of step iv), a thickness measured as above, this time of the layer 12 alone, the layer 20 being completely removed by the grinding step, of at least 0.4 mm.

By way of indication the process flow according to the method of the disclosure may be the following: rough-machining of the parts (rough-machined rings), prior heat treatment: hardening austenitization, hardening and primary tempering, machining, nitriding at a temperature lower than that used during the primary tempering and grinding/smoothing and finishing operations.

The preliminary heat treatment required depends on the composition of the steel and the final strength and hardness will vary depending the type of austenitization performed and also the primary tempering temperatures. The heat treatment should refine the preceding austenite grains, which is advantageous.

Examples (non-limiting and purely indicative in nature) of possible processes are:

Austenitization at 845° C. for 1.5 hours at high temperature;

Hardening in oil; at a temperature of 55° C., with stirring;

Residual washing of oil in hot water;

Primary tempering at 580° C. for 3 hours at high temperature (above the nitriding temperature);

Or, in particular for alloyed steels, such as those selected according to the disclosure:

Austenitization at 925-950° C. for 1.5 hours at high temperature;

Hardening in oil; at a temperature of 50-70° C., with stirring;

Residual washing of oil in hot water; and/or

Primary hardening at 615-650° C. for 3-4 hours at high temperature; above the maximum nitriding temperature.

The hardness range of the entire resultant ring 2, 3 is 34-41 HRC (150 kgf). Preferably, the hardness obtained is close to the top end of this range, for example 40 HRC.

The resultant microstructure, which will be subsequently that of the core 10, must not contain ferrite and/or pearlite.

Thereafter, in order to achieve the nitriding depth of 0.1-0.8 mm in a reasonable process time, it is possible to operate within the range of 500-580° C. for 2 to 50 hours, although in most cases the nitriding depth of 0.7 mm is reached in about 200 hours.

The resultant compound or superficial white layer 20 is hard, but fragile and is inevitable. Therefore, it is removed to expose the underlying hardened diffusion zone to the nitrides, forming the layer 12, which according to the disclosure controls the fatigue-resistance.

FIG. 3 shows purely by way of example the micrographic appearance, at different magnification levels, of various parts and zones of an outer ring 2 made according to the disclosure.

Figures 3A, 3B, 3C, 3D:
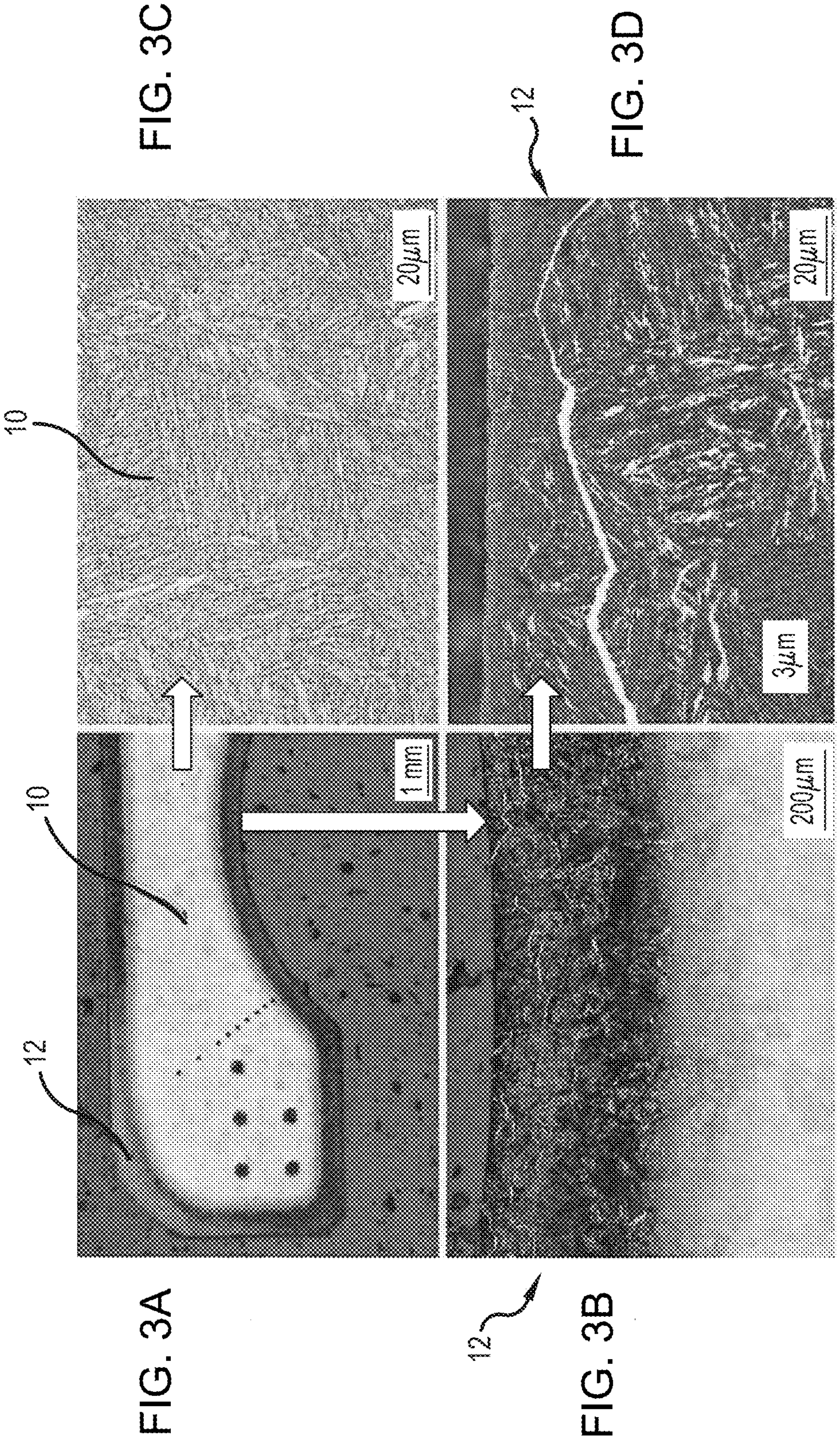
FIG. 3A is a micrograph of a radially sectioned left-half of an outer ring of a rolling bearing at a first magnification.
FIG. 3B is a micrograph of the surface layer of the outer ring of FIG. 3A at a second magnification.
FIG. 3C is a micrograph of the core of the outer ring of FIG. 3A at a third magnification.
FIG. 3D is a micrograph of the surface layer of the outer ring of FIG. 3A at a magnification greater than the second magnification.

Already clear and evident in FIG. 3A is the presence of a surface layer 12 which is clearly distinguishable from the lower layer or underlying core 10. The appearance of the core 10 is shown in FIG. 3C. FIGS. 3B and 3D show the micrographic appearance of the layer 12, In particular, in FIG. 3D it is possible to clearly see the metal nitrides mixed with the (minimum) presence of some azides which, however, since they are entirely embedded in the layer of metal nitrides, not only do not pose problems, but on the contrary improve the performance of the layer 12 of the bearing ring according to the disclosure.

As a result of that described above, it is possible to obtain an improved performance for the metal rings of super-precision rolling bearings, operating in difficult lubrication, speed and load conditions. In particular, it is possible to obtain improvements in the performance as regards the resistance to adhesive wear and fatigue activated on the surface of the rings.

Moreover, although the performance results which can be obtained are decidedly superior to those of conventional 100Cr6 hardened and tempered steel used for the production of bearing rings for the aforementioned type of application, this does not result in a corresponding increase in the production costs.

Finally, owing to the disclosure, it is not required to use steels for tools which are highly alloyed or manufacturing processes which are complex, costly and have a high energy consumption, such as sintering and diffusion bonding.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved super-precision rolling bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A super-precision rolling bearing comprising:

a first ring having a first raceway, a second ring having a second raceway, and a plurality of rolling elements arranged between the first and second raceways, wherein the first ring and/or the second ring is made of a hardened and tempered nitriding steel core having a first predetermined hardness and a nitrided surface layer coating at least the first raceway and containing nitrides in an amount to give the nitrided steel layer a second predetermined hardness greater than the first predetermined hardness, wherein the first predetermined hardness is between 34 and 41 HRC and the second predetermined hardness is between 64 and 66 HRC, wherein the nitrided surface layer completely surrounds and covers the core and has a depth, measured perpendicular to the nitrided surface of at least 0.4 mm, and wherein the nitrided surface layer is composed exclusively or almost exclusively of metal nitrides.

2. The rolling bearing according to claim 1, wherein the first ring and/or the second ring comprises the first ring and the second ring.

3. The rolling bearing according to claim 1, wherein the nitriding steel satisfies the specifications of AMS6481E (2022).

4. The rolling bearing according to claim 1, wherein the nitriding steel is 33CrMoV12 or 32CrMoV13.

5. The rolling bearing according to claim 1, wherein the core is substantially free of ferrite and/or pearlite.

6. A super-precision rolling bearing comprising:

a first ring having a first raceway, a second ring having a second raceway, and a plurality of rolling elements arranged between the first and second raceways, wherein the first ring and/or the second ring is made of a hardened and tempered nitriding steel core having a first predetermined hardness and a nitrided surface layer coating at least the first raceway and containing nitrides in an amount to give the nitrided steel layer a second predetermined hardness greater than the first predetermined hardness, wherein the first predetermined hardness is between 34 and 41 HRC and the second predetermined hardness is between 64 and 66 HRC, and wherein the nitrided surface layer has a carbon content of between 0.14% and 0.21% by weight and a nitrogen content of not more than 0.3% by weight.

7. The rolling bearing according to claim 6, wherein the core is substantially free of ferrite and/or pearlite, wherein the nitrided surface layer completely surrounds and covers the core and has a depth, measured perpendicular to the nitrided surface of at least 0.4 mm, and wherein the nitrided surface layer is composed exclusively or almost exclusively of metal nitrides.

* * * * *